(12) United States Patent
Tsukamoto et al.

(10) Patent No.: US 8,813,891 B2
(45) Date of Patent: Aug. 26, 2014

(54) BATTERY MODULE MOUNTING STRUCTURE FOR MOTOR-DRIVEN TWO-WHEELED VEHICLE

(75) Inventors: Tomohiro Tsukamoto, Saitama (JP); Kazumi Shibata, Saitama (JP); Takashi Tominaga, Saitama (JP); Susumu Akutsu, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 326 days.

(21) Appl. No.: 13/250,169

(22) Filed: Sep. 30, 2011

(65) Prior Publication Data
US 2012/0080254 A1    Apr. 5, 2012

(30) Foreign Application Priority Data

Sep. 30, 2010  (JP) ................. 2010-222877

(51) Int. Cl.
*B62M 7/12*    (2006.01)
*B60K 1/04*    (2006.01)
*B60L 11/18*   (2006.01)
*B62K 11/10*   (2006.01)
*B60K 1/00*    (2006.01)

(52) U.S. Cl.
CPC ............ *B60L 11/1877* (2013.01); *B62K 11/10* (2013.01); *B62K 2202/00* (2013.01); *B62K 2208/00* (2013.01); *B60K 1/04* (2013.01); *B60K 2001/008* (2013.01); *B60K 2001/0416* (2013.01); *B60Y 2200/126* (2013.01); *B60Y 2400/61* (2013.01); *B62M 7/12* (2013.01)
USPC ............................ 180/220; 180/312; 180/68.5

(58) Field of Classification Search
CPC ........... B62K 2204/00; B62K 2202/00; B62K 2208/00; B62K 11/10; B60L 2200/12; B60L 11/1877; B60L 11/1875; B62M 7/12; B62M 6/90; B62M 6/40; Y02T 10/7005; B60K 1/04; B60K 2001/008; B60K 2001/04; B60Y 2200/126; B60Y 2400/61
USPC ............ 180/65.1, 220, 312, 311, 68.5, 65.31; 429/120
See application file for complete search history.

(56) References Cited

U.S. PATENT DOCUMENTS 4,436,174 A  *  3/1984  Morisono .................... 180/227
5,524,726 A  *  6/1996  Wright, Jr. ................... 180/220

(Continued)

FOREIGN PATENT DOCUMENTS

JP         2008-221976 A       9/2008

*Primary Examiner* — Katy M Ebner
*Assistant Examiner* — Emma K Frick
(74) *Attorney, Agent, or Firm* — Birch, Stewart, Kolasch & Birch, LLP

(57) ABSTRACT

A battery module mounting structure includes a housing structure housing a battery supplying electric power to the electric motor of a motor-driven two-wheeled vehicle and a PDU controlling the electric motor. The housing case is configured to be mountable to and dismountable from the swing arm with the electric motor and a control substrate housed in the housing case. The swing arm is formed as a cantilever type in which an arm portion disposed on the vehicle-widthwise right or left of a rear wheel supports the rear wheel. The battery shaped in a rectangular parallelepiped is housed in the housing case with a longitudinal direction thereof facing in a vehicle-width direction. The housing case is mounted from a vehicle-widthwise inside on a lateral surface of a swing arm housing at a position vehicle-body-forward of the rear wheel and vehicle-body-rearward of a through-hole, the swing arm housing supporting the arm portion.

19 Claims, 11 Drawing Sheets

(56) References Cited

U.S. PATENT DOCUMENTS

| | | | |
|---|---|---|---|
| 5,633,095 A * | 5/1997 | Ishikawa et al. | 429/1 |
| 6,176,338 B1 * | 1/2001 | Nakagawa et al. | 180/219 |
| 7,931,110 B2 * | 4/2011 | Nishiura et al. | 180/220 |
| 7,971,673 B2 * | 7/2011 | Sasage et al. | 180/220 |
| 8,002,067 B2 * | 8/2011 | Nishiura et al. | 180/220 |
| 8,167,070 B2 * | 5/2012 | Takamura et al. | 180/68.5 |
| 8,273,471 B2 * | 9/2012 | Hain et al. | 429/7 |
| 8,443,926 B2 * | 5/2013 | Kanno et al. | 180/220 |
| 2011/0290578 A1 * | 12/2011 | Nishiura et al. | 180/291 |
| 2012/0000720 A1 * | 1/2012 | Honda et al. | 180/65.1 |
| 2012/0048630 A1 * | 3/2012 | Nishiura et al. | 180/65.31 |
| 2012/0082881 A1 * | 4/2012 | Tsukamoto et al. | 429/120 |
| 2012/0160579 A1 * | 6/2012 | Taniguchi et al. | 180/65.1 |
| 2012/0181097 A1 * | 7/2012 | Hatanaka et al. | 180/65.31 |
| 2013/0075177 A1 * | 3/2013 | Tako et al. | 180/220 |
| 2013/0153323 A1 * | 6/2013 | Tsukamoto et al. | 180/220 |
| 2013/0161107 A1 * | 6/2013 | Tsukamoto et al. | 180/220 |
| 2013/0175102 A1 * | 7/2013 | Tsukamoto et al. | 180/21 |

* cited by examiner

BATTERY MODULE MOUNTING STRUCTURE FOR MOTOR-DRIVEN TWO-WHEELED VEHICLE

CROSS-REFERENCE TO RELATED APPLICATIONS

The present application claims priority under 35 USC 119 to Japanese Patent Application No. 2010-222877 filed on Sep. 30, 2010 the entire contents of which are hereby incorporated by reference.

BACKGROUND OF THE INVENTION

1. Field of the Invention

The present invention relates generally to a battery module mounting structure for a motor-driven two-wheeled vehicle. More particularly, to a battery module mounting structure for a motor-driven two-wheeled vehicle in which a motor as a power source is driven by electric power supplied from an in-vehicle battery.

2. Description of Background Art

It has been considered in motor-driven two-wheeled vehicles traveling by use of a motor as a power source, to optimize the arrangement and structure of a high-voltage battery supplying electric power to a motor and of a motor control unit.

Japanese Patent Laid-Open No. 2008-221976 discloses a motor-driven two-wheeled vehicle with a battery, a motor control unit, a motor, etc. that are internally installed in a swing arm (a unit swing) rotatably supporting a rear wheel as a drive wheel. In addition, the swing arm is swingably mounted on the lower portion of a vehicle body.

Two-wheeled vehicles with a small redundant space have a problem as identified below. The mounting positions of the power system parts such as a battery, a motor control unit, etc., are individually set according to the body layout of each vehicle. Therefore, the number of dedicated mounting parts is increased and the assembly work is complicated. In addition, the technology described in Japanese Patent Laid-Open No. 2008-221976 does not allow for the increased efficiency of assembling work and enhanced maintenance performance by making is possible to mount and dismount these power system parts to and from the vehicle body.

SUMMARY AND OBJECTS OF THE INVENTION

It is an object of an embodiment of the present invention to solve the problem of the conventional technology and particularly to provide a battery module mounting structure for a motor-driven two-wheeled vehicle in which power system parts such as a battery, a motor control unit, etc., are unitized and allowed to be easily mounted to and dismounted from a vehicle body.

To achieve the above object, according to an embodiment of the present invention, a battery module mounting structure for a motor-driven two-wheeled vehicle is provided wherein an electric motor (M) driving a rear wheel (WR) of the vehicle (1) and a PDU (50) are disposed in a swing arm (30, 30a) rotatably supporting the rear wheel (WR) and swingably supported by a vehicle body via a swing shaft (19) passing through a through-hole (19) formed in a front side of the vehicle body, including a housing case (300, 400) housing a battery (56) supplying electric power to the electric motor (M). The PDU (50) controlling the electric motor (M); and in that the housing case (300, 400) is configured to be mountable to and dismountable from the swing arm (30, 30a) with the battery (56) and the PDU (50) housed in the housing case (300, 400).

According to an embodiment of the present invention, the swing arm (30) is of a cantilever type in which an arm portion (39) disposed on the vehicle-widthwise right or left of the rear wheel (WR) supports the rear wheel (WR) wherein the battery (56) is shaped in a rectangular parallelepiped and is housed in the housing case (300) with a longitudinal direction thereof facing in a vehicle-width direction. The housing case (300) is mounted from a vehicle-widthwise inside on a lateral surface of a swing arm housing (330) at a position vehicle-body-forward of the rear wheel (WR) and vehicle-body-rearward of the through-hole (19a) with the swing arm housing (330) supporting the arm portion (39).

According to an embodiment of the present invention, a heater element substrate (50b) which constitutes part of the PDU (50) and on which a heater element (350) having high-calorific power is mounted is aligned with the battery (56) in a back and forth direction of the vehicle body so as not to overlap the battery (56) as viewed from the side of the vehicle body.

According to an embodiment of the present invention, the swing arm (30a) is of a cantilever type in which an arm portion (39) disposed on the vehicle-widthwise right or left of the rear wheel (WR) supports the rear wheel (WR). The battery (56), shaped in a rectangular parallelepiped, is housed in the housing case (400) with a longitudinal direction thereof facing in a vertical direction of the vehicle body; and in that the housing case (400) is mounted from above the vehicle body on an upper surface of a swing arm housing (430) at a position that is vehicle-body-forward of the rear wheel (WR) and vehicle-body-rearward of the through-hole (19a) with the swing arm housing (430) supporting the arm portion (39).

According to an embodiment of the present invention, a heater element substrate (50b) which constitutes part of the PDU (50) and on which a heater element (350) having high-calorific power is mounted is aligned with the battery (56) in a vehicle-width direction so as not to overlap the battery (56) as viewed from above the vehicle body.

According to an embodiment of the present invention, the battery (56) is configured such that a plurality of laminate type battery cells (56a) are stacked each of which is packed with a soft laminate sheet on a cell to cell basis.

According to an embodiment of the present invention, the battery (56) is housed in the housing case (300, 400) and thereafter a potting compound (362) is poured into an opening portion of the housing case (300, 400) to secure the battery (56) to the housing case (300, 400).

According to an embodiment of the present invention, the potting using the potting compound (362) is performed to cover also the aluminum substrate (50c) constituting part of the PDU (50) and disposed adjacently to one lateral surface of the battery (56); and in that sponge rubber (360) lighter than the potting compound (362) is disposed between one end surface of the battery (56) and an aluminum substrate (50c).

According to an embodiment of the present invention, the PDU (50) includes the aluminum substrate (50c) disposed adjacently to one lateral surface of the battery (56), with a control substrate (50a) spaced at a given interval apart from the aluminum substrate (50c), and a heater element substrate (50b) disposed at a position between the control substrate (50a) and the aluminum substrate (50c) and offset from one lateral surface of the battery (56). A heater element (350, 450) having higher-calorific power than the control substrate (50a) and the aluminum substrate (50c) is mounted on the heater element substrate (50b).

According to an embodiment of the present invention, the housing case (300, 400) is composed of a battery housing portion (301, 401) housing the battery (56) and a heater element housing portion (302, 303) housing the heater element (350, 450).

According to an embodiment of the present invention, the battery module mounting structure includes the housing structure housing the battery supplying electric power to the electric motor and the PDU controlling the electric motor. In addition, the housing case is configured to be mountable to and dismountable from the swing arm with the battery and the PDU housed in the housing case. Therefore, the battery and the substrates can be handled as a module mountable to and dismountable from the swing arm. This makes it possible to previously perform the temporary assembling work for securing the battery and the like to the housing case. Thus, the swing arm assembly efficiency can be improved. In addition, the work for replacing the battery after the completion of the vehicle can be facilitated and the general versatility in which a communalized housing case is applied to a variety of swing arms can be enhanced. Since the housing case and the housed parts can collectively be designed, they can easily be designed while optimizing the balance of the center of gravity of the entire module.

According to an embodiment of the present invention, the swing arm is of a cantilever type in which the arm portion disposed on the vehicle-widthwise right or left of the rear wheel supports the rear wheel. The battery shaped in a rectangular parallelepiped is housed in the housing case with a longitudinal direction thereof facing in a vehicle-width direction. The housing case is mounted from a vehicle-widthwise inside on a lateral surface of the swing arm housing at a position vehicle-body-forward of the rear wheel and vehicle-body-rearward of the through-hole, the swing arm housing supporting the arm portion. Therefore, the battery module mounting structure suitable for the vehicle having a large vehicle-widthwise size can be provided. In addition, the position of the center of gravity of the vehicle body can be suppressed to a low level while ensuring the vehicle-widthwise balance of the weight of the swing arm.

According to an embodiment of the present invention, the heater element substrate which constitutes part of the PDU and on which the heater element having high-calorific power is mounted is aligned with the battery in the back and forth direction of the vehicle body so as not to overlap the battery as viewed from the side of the vehicle body. Therefore, it is possible to prevent the heat generation of the battery from affecting the heater element substrate.

According to an embodiment of the present invention, the swing arm is of a cantilever type in which the arm portion disposed on the vehicle-widthwise right or left of the rear wheel supports the rear wheel. The battery shaped in a rectangular parallelepiped is housed in the housing case with a longitudinal direction thereof facing in a vertical direction of the vehicle body. The housing case is mounted from above the vehicle body on the upper surface of a swing arm housing at a position vehicle-body-forward of the rear wheel and vehicle-body-rearward of the through-hole with the swing arm housing supporting the arm portion. Therefore, the battery module mounting structure can be provided that is reduced in the vehicle-widthwise size of the swing arm.

According to an embodiment of the present invention, the heater element substrate which constitutes part of the PDU and on which a heater element having high-calorific power is mounted is aligned with the battery in a vehicle-width direction so as not to overlap the battery as viewed from above the vehicle body. Therefore, the heater element substrate can be arranged by effectively utilizing the vehicle-widthwise space which can be ensured by allowing the longitudinal direction of the battery to face in the vertical direction of the vehicle body. In addition, it is possible to prevent the heat generation of the battery from affecting the heater element substrate.

According to an embodiment of the present invention, the battery is configured such that a plurality of laminate type battery cells are stacked with each being packed with a soft laminate sheet on a cell to cell basis. Therefore, it is not necessary to provide a case member on a battery-cell to battery-cell basis. In addition, the battery-cells can be arranged in contact with each other. Thus, the capacity of the battery can be increased while avoiding the enlargement of the swing arm. In addition, the work for mounting the battery to the swing arm and the work for replacing the battery can be facilitated.

According to an embodiment of the present invention, the battery is housed in the housing case and thereafter a potting compound is poured into the opening portion of the housing case to secure the battery to the housing case. Therefore, a dedicated support member or the like for securing the battery is eliminated.

According to an embodiment of the present invention, the potting using the potting compound is performed to cover also the aluminum substrate constituting part of the PDU and disposed adjacent to one lateral surface of the battery. In addition, the sponge rubber lighter than the potting compound is disposed between one end surface of the battery and the aluminum substrate. Therefore, the used amount of the potting compound heavier than the sponge rubber can be reduced by the volume of the sponge rubber, so that the swing arm can be reduced in weight.

According to an embodiment of the present invention, the PDU includes the aluminum substrate disposed adjacent to one lateral surface of the battery, the control substrate spaced at a given interval apart from the aluminum substrate, and the heater element substrate disposed at a position between the control substrate and the aluminum substrate and offset from one lateral surface of the battery. In addition, the heater elements having higher-calorific power than the control substrate and the aluminum substrate are mounted on the heater element substrate. Therefore, the heater element substrate having high-calorific power can be disposed at a position away from the battery generating heat.

According to an embodiment of the present invention, the housing case is composed of the battery housing portion housing the battery and the heater element housing portion housing the heater element. Therefore, the battery and the heater element substrate can be divided and be housed so that they can more effectively avoid the mutual thermal influence therebetween.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
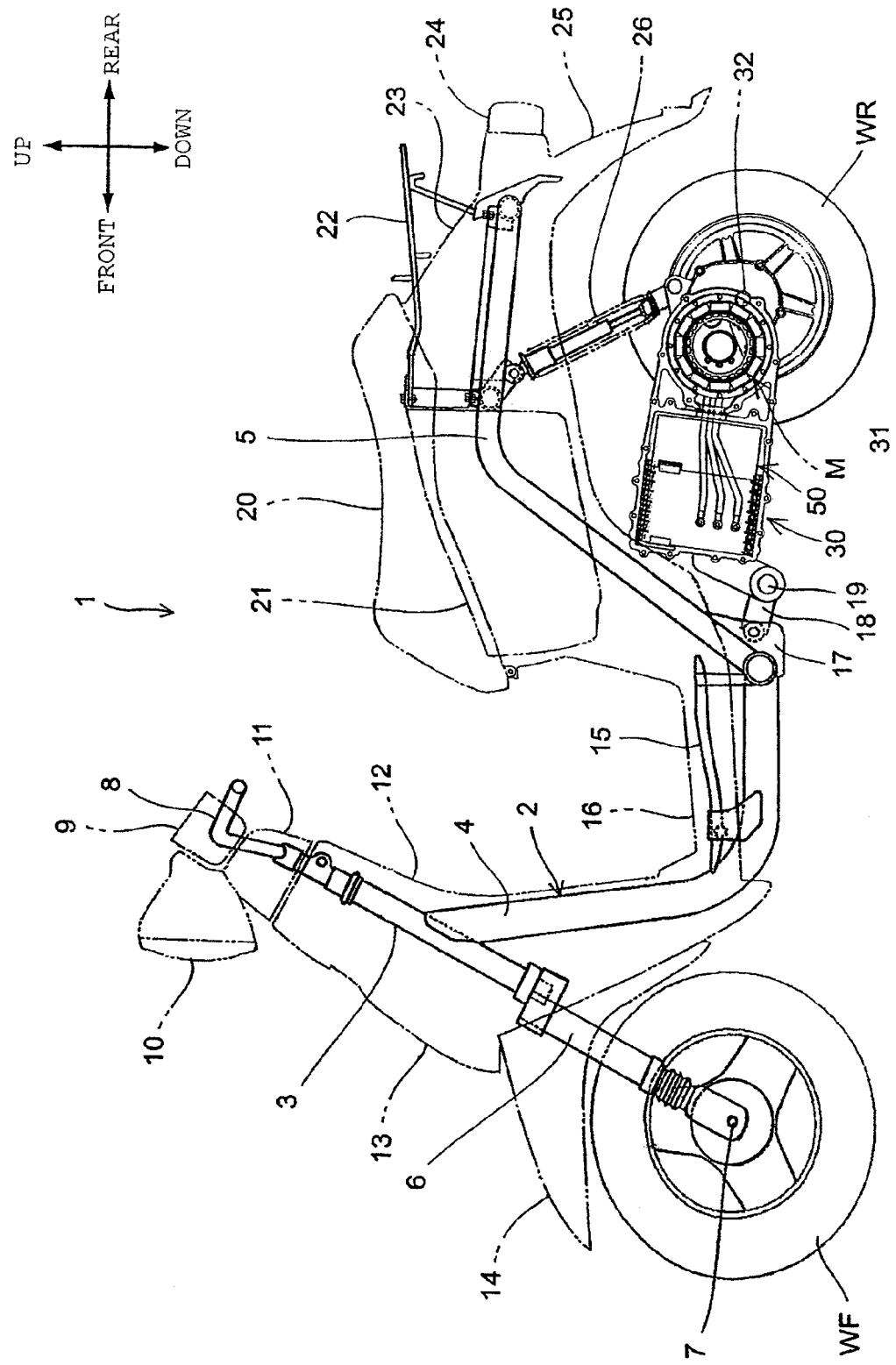
FIG. 1 is a lateral view of a motor-driven two-wheeled vehicle according to an embodiment of the present invention.

Preferred embodiments of the present invention will hereinafter be described in detail with reference to the drawings. FIG. 1 is a lateral view of a motor-driven two-wheeled vehicle 1 according to an embodiment of the present invention. The motor-driven two-wheeled vehicle 1 is a scooter-type, straddle-ride type vehicle having a low-floor 16. A rear wheel WR is driven by an electric motor M housed in a swing arm unit 30. A head pipe 3 turnably supporting a stem shaft (not shown) is joined to a front portion of a body frame 2. A steering handlebar 8 covered by a handlebar cover 11 is joined to an upper portion of the stem shaft. A pair of left and right front forks 6 is joined to a lower portion of the stem shaft. The front forks 6 rotatably support a front wheel WF via an axle 7.

The body frame 2 includes a main pipe 4 extending downward from a rear portion of the head pipe 3 and a rear frame 5 connected to a rear end portion of the main pipe 4 and extending upward and toward the rear of a vehicle body. A floor frame 15 supporting the low-floor 16 is mounted on a portion of the main pipe 4 located under the low-floor 16. A pair of left and right pivot plates 17 is attached to a joint portion between the main pipe 4 and the rear frame 5.

The swing arm 30 is of a cantilever type having an arm portion only on the left side in a vehicle-width direction. The swing arm 30 is swingably supported by the body frame 2 via a swing shaft 19 passing through a link 18 attached to the pivot plate 17. The swing arm 30 is a partially hollow structure made of metal such as aluminum or the like. An electric motor M is housed in the swing arm 30 at a position close to an axle 32. In addition, a PDU (a power drive unit, hereinafter, simply referred to as the board sometimes) 50 serving as a control unit is disposed vehicle-body-forward of the electric motor M in the swing arm 30. A battery 56 (see FIG. 3), adapted to supply electric power to the electric motor M, is disposed on the right of the board 50 in the vehicle-width direction.

The rear wheel WR is rotatably supported by the swing arm 30 via the axle 32. The rear end portion of the swing arm 30 is suspended by the rear frame 5 via a rear shock absorber 26. A housing box 21 serving as a luggage space is disposed below a seat 20 so as to be put between a pair of the left and right rear frames 5.

The main pipe 4 of the body frame 2 is covered by a front cowl 13 on the front side of the vehicle body and by a leg shield 12 on the rear side of the vehicle body. A meter device 9 is disposed on the handlebar cover 11. A headlight 10 is mounted on the vehicle-body-front side of the meter device 9. A front fender 14 is secured to the upper portions of the front forks 6 so as to cover the front wheel WF.

The rear frame 5 is covered from the outside on the vehicle-width direction by a seat cowl 23. A taillight device 24 is attached to the rear end portion of the seat cowl 23. A rear carrier 22 joined to the rear frame 5 projects above the taillight device 24. A rear fender 25 is installed below the taillight device 24 so as to cover the rear upper portion of the rear wheel WR.

Figure 2:
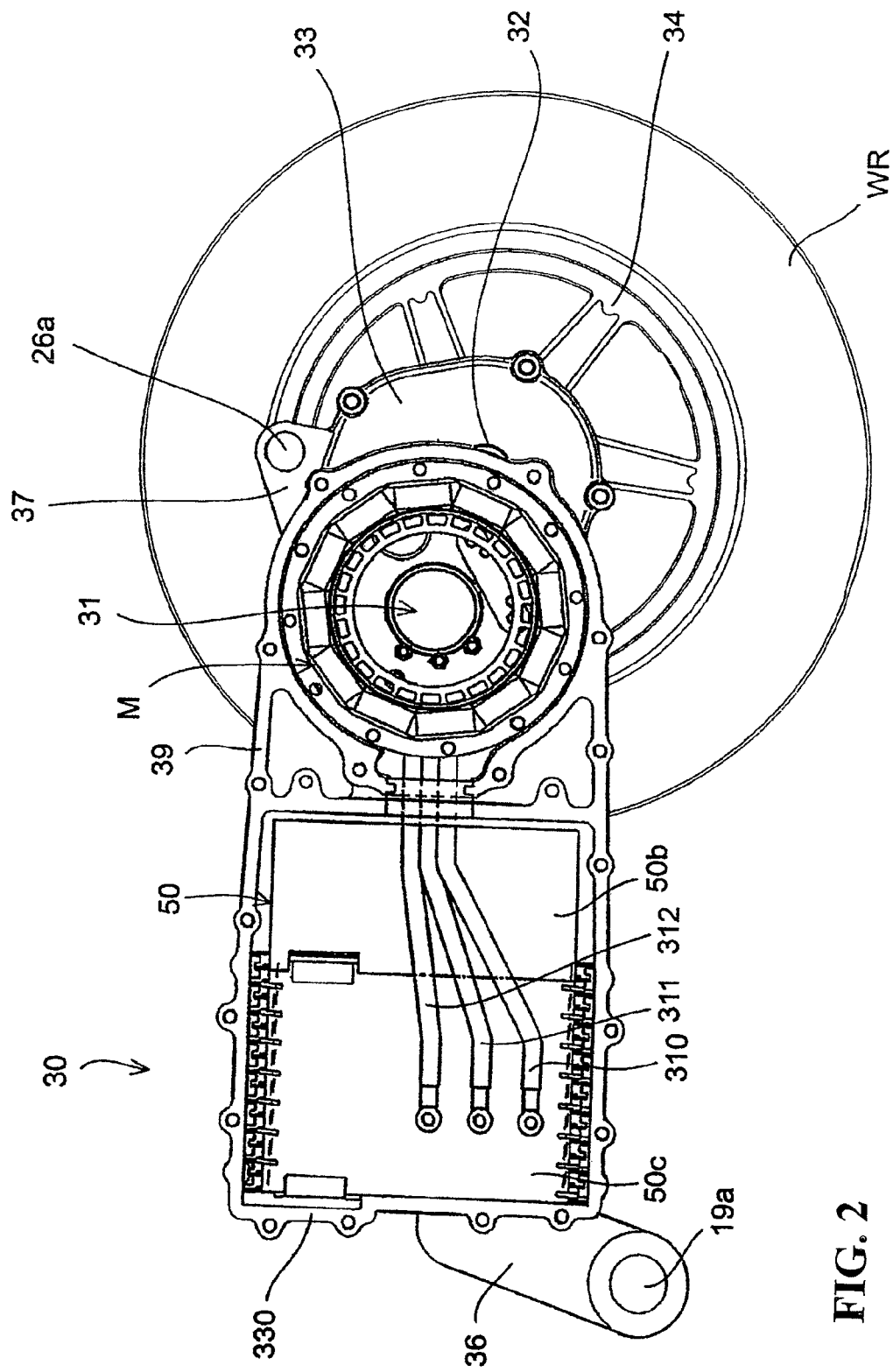
FIG. 2 is an enlarged lateral view of a swing arm.
Figure 3:
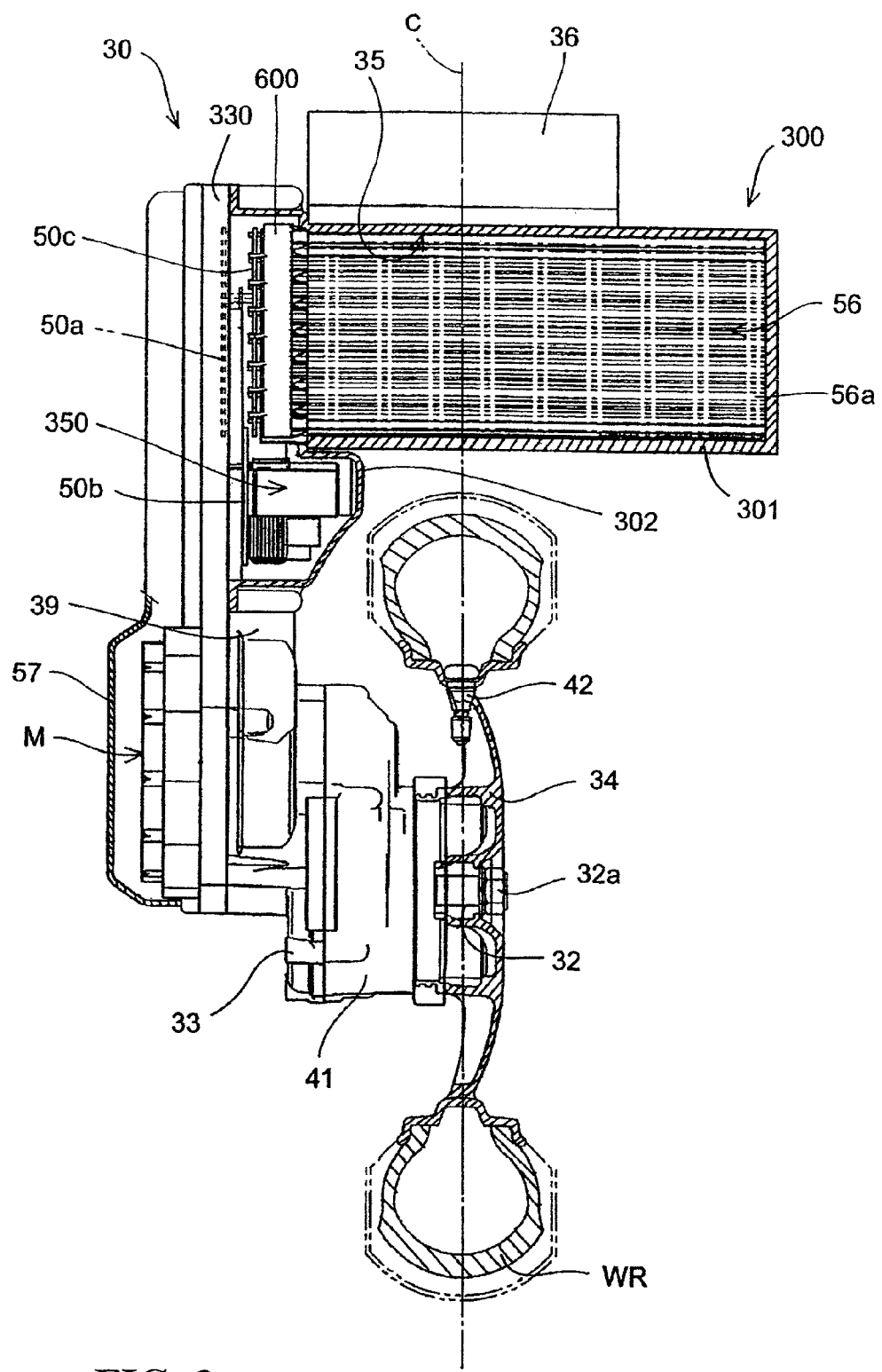
FIG. 3 is a partial-sectional top plan view of the swing arm.

FIG. 2 is an enlarged lateral view of the swing arm 30 with a swing arm cover 57 thereof removed. FIG. 3 is a partial-sectional top plan view of the swing arm 30. The same reference numerals as in the above denote like or corresponding portions. As described above, the swing arm 30 is a partially hollow structure made of aluminum or the like. In addition, the swing arm 30 is of a cantilever type in which the arm portion 39 on the left side in the vehicle-width direction supports the rear wheel WR. A pair of left and right pivot flanges 36 each formed with a through-hole 19a for the swing shaft 19 (see FIG. 1) is installed vehicle-body-forward of and below the swing arm 30.

Figure 5:
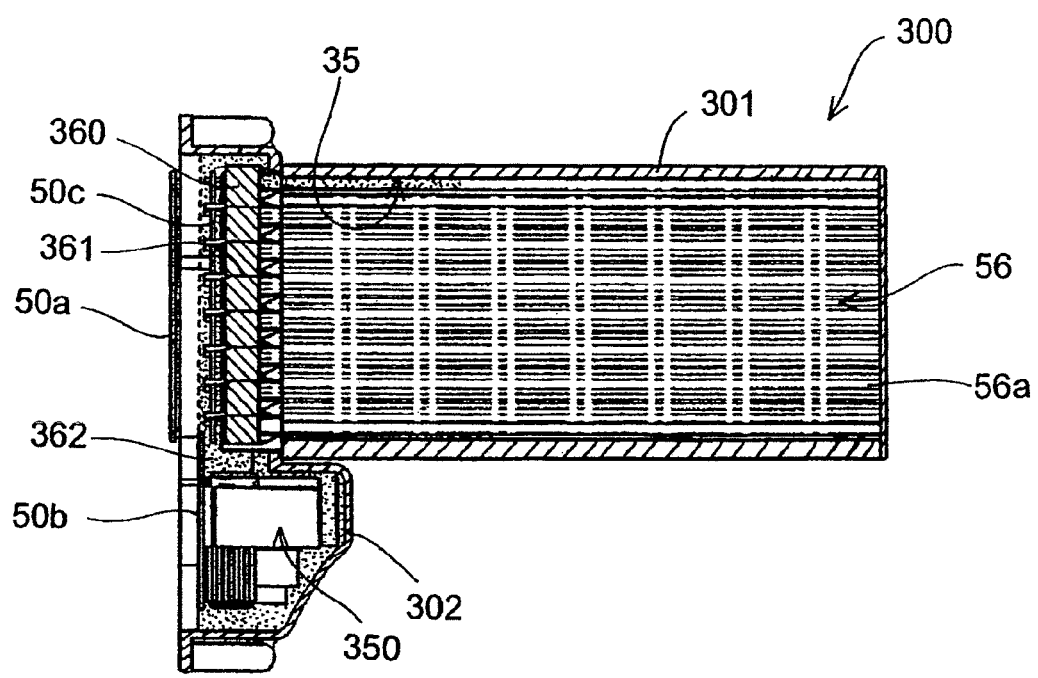
FIG. 5 is a cross-sectional top plan view of a housing case.

A housing case 300 housing a generally rectangular parallelepipedic battery 56 and the like is disposed vehicle-body-rearward of the pivot flange 36. As illustrated in FIG. 5, the housing case 300 is removably mounted to a sidewall, on the vehicle-widthwise inside (on the vehicle-widthwise right side), of a swing arm housing 330 formed integrally with the vehicle-body-front side of the arm portion 39. The swing arm housing 330 and the housing case 300 are secured to each other by means of fastening members such as screws or the like. With this, temporary assembling work for securing the battery 56 and the like to the housing case 300 can be done beforehand. Therefore, assembly efficiency of the swing arm 30 can be improved. Work for replacing the battery after the completion of the vehicle can be facilitated and general versatility in which a communalized housing case is applied to a variety of swing arms can be enhanced.

The board 50 serving as a PDU is disposed on the vehicle-widthwise left side of the battery 56. The PDU is used to control the electric motor M and the like. In addition, the board 50 includes an aluminum substrate 50c, a control substrate 50a, and a heater element substrate 50b. The aluminum substrate 50c is disposed adjacently to the vehicle-body-left lateral surface of the battery 56. The control substrate 50a is spaced at a given interval apart from the aluminum substrate 50c and disposed at a position overlapping the aluminum substrate 50c as viewed from the side of the vehicle body. The heater element substrate 50b is disposed at a position between the control substrate 50a and the aluminum substrate 50c and on the vehicle-body-rearward of both the substrates 50a and 50c.

Elements having low calorific power such as signal elements or the like are mounted on the control substrate 50a. In contrast to this, elements having a high calorific power, i.e., heater elements 350 are mounted on the heater element substrate 50b. Examples of the elements having high calorific power includes a thermistor, an input-output filter group for battery charger, a capacitor for improving battery charger power factor (a PFC circuit), a capacitor for battery charger DC conversion (an AC-DC transformer), and various transformer groups (DC-DC transformers and the like). Semiconductor elements or the like having a lower heat capacity than the heater elements mounted on the heater element substrate 50b are mounted on the aluminum substrate 50c. The heater element substrate 50b in which only the heater elements having high calorific power are centrally arranged is installed as described above. Therefore, it is possible to reduce thermal loading of the heater elements exerted on the other elements.

The heater element substrate 50b is disposed on the vehicle-body-rearward of the control substrate 50a. Therefore, it is possible to prevent the heater elements from having thermal influence on the control substrate 50a located on the upstream side in the traveling direction of the vehicle body.

A U-phase line 310, a V-phase line 311 and a W-phase line 312 are connected to the aluminum substrate 50c to supply electric power to the transmission motor M. A thin plate-like swing arm cover 57 (removed in FIGS. 1 and 2) is attached to the vehicle-widthwise left side of the swing arm housing 330 so as to integrally cover the board 50 and the electric motor M. The electric motor M is configured to be removable from the swing arm 30 by accessing from the attachment direction of the swing arm cover 57. Thus, the electric motor M has high maintenance performance.

A reducer case 33 and 41 housing a reducer therein is attached to the rear end portion of the arm portion 39. The reducer reduces the rotation of the electric motor M. The axle 32 projects from the reducer case 41 toward the vehicle-widthwise right side. A wheel 34 of the rear wheel WR is secured to the end portion of the axle 32 by means of a nut 32a. The rear wheel WR, that uses a tubeless tire, and the wheel 34 is provided with an air valve 42. The reducer case 33 is provided with an attachment flange 37 having a through-hole 26a used to attach the rear shock absorber 26 (see FIG. 1) thereto.

The battery 56 has a module structure in which a plurality of battery cells are connected to one another to provide a predetermined high-voltage. The plate-like battery cells 56a are stacked one on another and fitted in a housing space 35 with their flat surface portions oriented in the back and forth direction of the vehicle body. In this way, the battery 56 as a heavy load is disposed close to the swing shaft 19 of the swing arm 30. Therefore, the inertia moment of the swing arm 30 during swinging can be reduced to allow for a smooth swinging motion.

Each battery cell 56a is of a laminate-type in which the battery cell is packed with a soft laminate sheet on a cell to cell basis. The laminate type battery can expect to increase energy density and improve radiation performance as well as to facilitate work for mounting the battery to the housing space 35 and work for replacing the battery.

Figure 4:
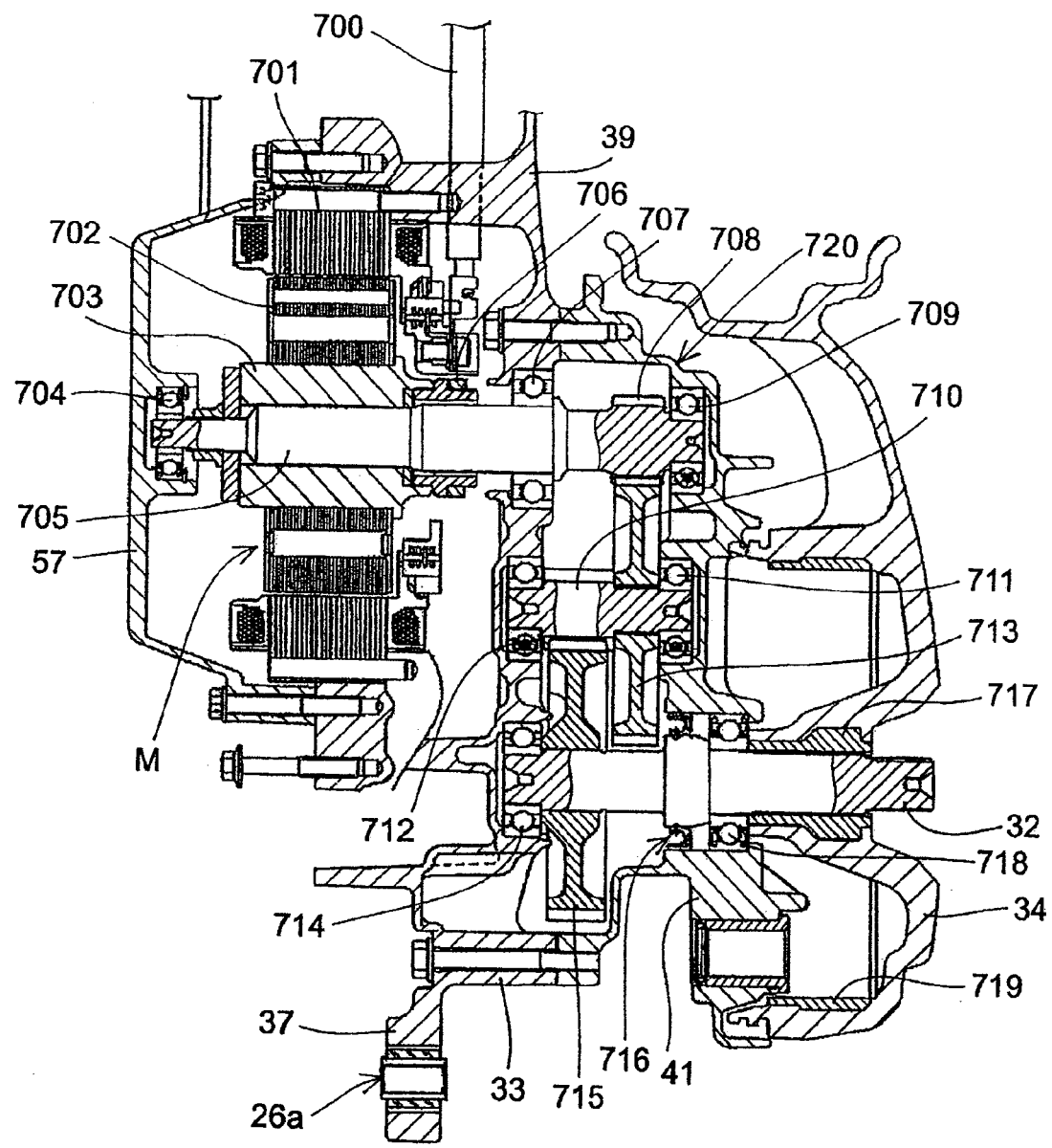
FIG. 4 is an enlarged cross-sectional view of a speed-reduction mechanism.

FIG. 4 is an enlarged cross-sectional view of a speed-reduction mechanism 720. The speed-reduction mechanism is disposed between the electric motor M and the axle 32. The swing arm 30 according to the present embodiment is of a cantilever type in which only the left arm portion rotatably supports the rear wheel WR. In addition, the electric motor M and the speed-reduction mechanism 720 are centrally arranged at a position on the vehicle-body-rear side of the arm portion.

The electric motor M is of an inner rotor type composed of a stator 701 secured to the inner wall of the swing arm 30 and having a stator coil and a rotor 702 secured to a motor drive shaft 705 via a collar 703. The vehicle-widthwise left end portion of the motor drive shaft 705 is rotatably supported by a bearing 704 fitted to the swing arm cover 57. The vehicle-widthwise right side of the motor drive shaft 705 is rotatably supported by a bearing 707 fitted to the reducer case 33 and by a bearing 709 fitted to the reducer case 41. The vehicle-body rear end portion of the reducer case 33 is formed with the through-hole 26a for the rear shock absorber 26. An output line 700 of the electric motor M is disposed in the swing arm cover 57 and on the vehicle-body-front side of the electric motor M.

The rotational-drive force transmitted to the motor drive shaft 705 is transmitted to the final output shaft (the axle) 32 via the speed-reduction mechanism 720. More specifically, the rotational-drive force is transmitted to the final output shaft 32 via a first reduction gear 713, a first reduction shaft 710 and a second reduction gear 715. The first reduction gear 713 is meshed with a reduction gear 708 formed on the right end portion of the motor drive shaft 705 in FIG. 4. The first reduction shaft 710 is rotatably supported by a bearing 712 secured to the first reduction gear 713 and fitted to the reducer case 33 and by a bearing 711 fitted to the reducer case 41. The second reduction gear 715 is meshed with a reduction gear formed on the first reduction shaft 710. The final output shaft 32 is rotatably supported by a bearing 714 secured to the second reduction gear 715 and fitted to the reducer case 33 and by a bearing 718 fitted to the reducer case 41.

The wheel 34 of the rear wheel WR is secured via a collar 717 to the right end portion of the final output shaft 32 in FIG. 4. The wheel 34 is formed on the inner diameter side with a brake drum having a liner 719. A pair of upper and lower brake shoes (not shown) driven by a brake cam (not shown) is housed inside the brake drum. An oil seal 716 is disposed on the left side of the bearing 718 in FIG. 4.

Figure 6:
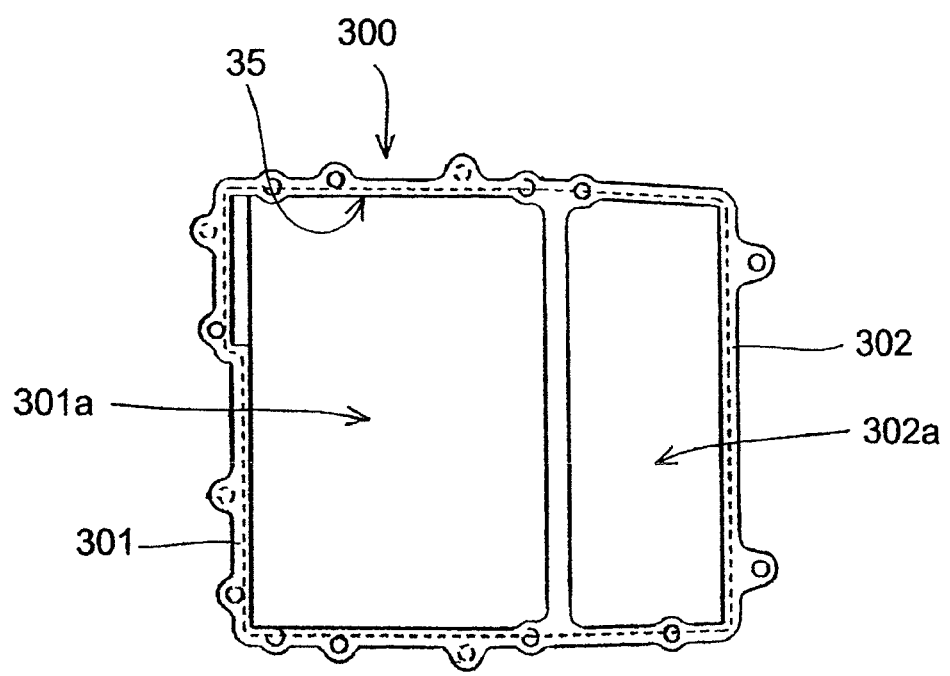
FIG. 6 is a lateral view of the housing case.

As illustrated in the lateral view of FIG. 6, the housing case 300 is configured such that a battery housing portion 301 and a heater element housing portion 302 are formed integrally with each other. The housing space 35 is composed of a quadrangular battery housing space 301a formed in the battery housing portion 301 and a recessed heater element housing space 302a formed in the heater element housing portion 302.

The generally rectangular parallelepipedic battery 56 composed of the plurality of battery cells 56a and having the longitudinal direction oriented in the vehicle-width direction is housed in the battery housing portion 301. The heater elements 350 mounted on the vehicle-widthwise right surface of the heater element substrate 50b are housed in the heater element housing portion 302 in such a manner that the upper end side of the heater elements 350 is inserted thereinto. The inner surface of the battery housing space 301a can be formed with guide grooves adapted to receive the plate-like battery cells 56a fitted thereto at respective predetermined positions.

The battery 56, the heater element substrate 50b and the aluminum substrate 50c are subjected to "resin potting." This potting physically secures the battery 56 and the board (PDU) 50 to the swing arm 30, is intended as insulation and vibration absorption of the heater element substrate 50b and of the aluminum substrate 50c, and enhances the radiation performance of each portion.

The potting is performed as below. The battery 56 and the substrates 50b and 50c are inserted at respective predetermined positions. Thereafter, a potting compound 362 (see FIG. 5) is poured around the battery 56 with the opening portion of the housing case 300 facing the upside. The potting compound 362 is made of a liquid resin curing with time.

Sponge rubber 360 with a predetermined thickness is disposed between the battery 56 and the aluminum substrate 50c. The sponge rubber 360 is formed with a plurality of slits adapted to receive plate-like battery terminals 361 inserted thereinto. The battery terminals 361 are provided at a left end portion of each battery cell 56a in FIG. 5. The positions of the battery terminals 361 are defined by the corresponding slits.

The sponge rubber 360 according to the present embodiment is formed of an elastomer resin as foamed rubber. This elastomer resin is a light material that is not infiltrated with the potting compound, is superior in heat resistance and in vibration-absorbing performance, and permits the passage of gas. In addition, the battery structure according to the present embodiment needs to connect each laminate cell (each battery cell) 56*a* with the aluminum substrate 50*c* via a sensor line and desires to seal the entire aluminum substrate 50*c* with the potting compound 362. All the space between each laminate cell 56*a* and the aluminum substrate 50*c* may be filled with the potting compound 362. However, even in such a case, the potting compound 362 filled in this portion just does not fulfill a function of securing the battery 56 to the battery housing space 301 but also increases the weight of the swing arm 30. In addition, such a potting compound 362 does not have passages for the gas discharged from the battery 56. For this reason, the present embodiment intends to optimize the filled state of the potting compound by disposing the sponge rubber 362 in the space between the laminate cells 56*a* and the aluminum substrate 50*c*.

In addition, the potting compound 362 has a relatively high viscosity during the pouring. Therefore, at least, the entire aluminum substrate 50*c* is subjected to the potting and an amount of the potting compound 362 that can secure the battery 56 needs only to be filled around the opening portion of the battery housing space 301. In other words, the potting compound 362 is not necessarily filled up to the lateral surface portion and bottom surface portion of the battery housing space 301. In the present embodiment, the workability during the potting is enhanced by performing the potting before the housing case 300 is mounted to the swing arm housing 330. However, the potting can be performed after the housing case 300 is secured to the swing arm housing 330.

Figure 7:
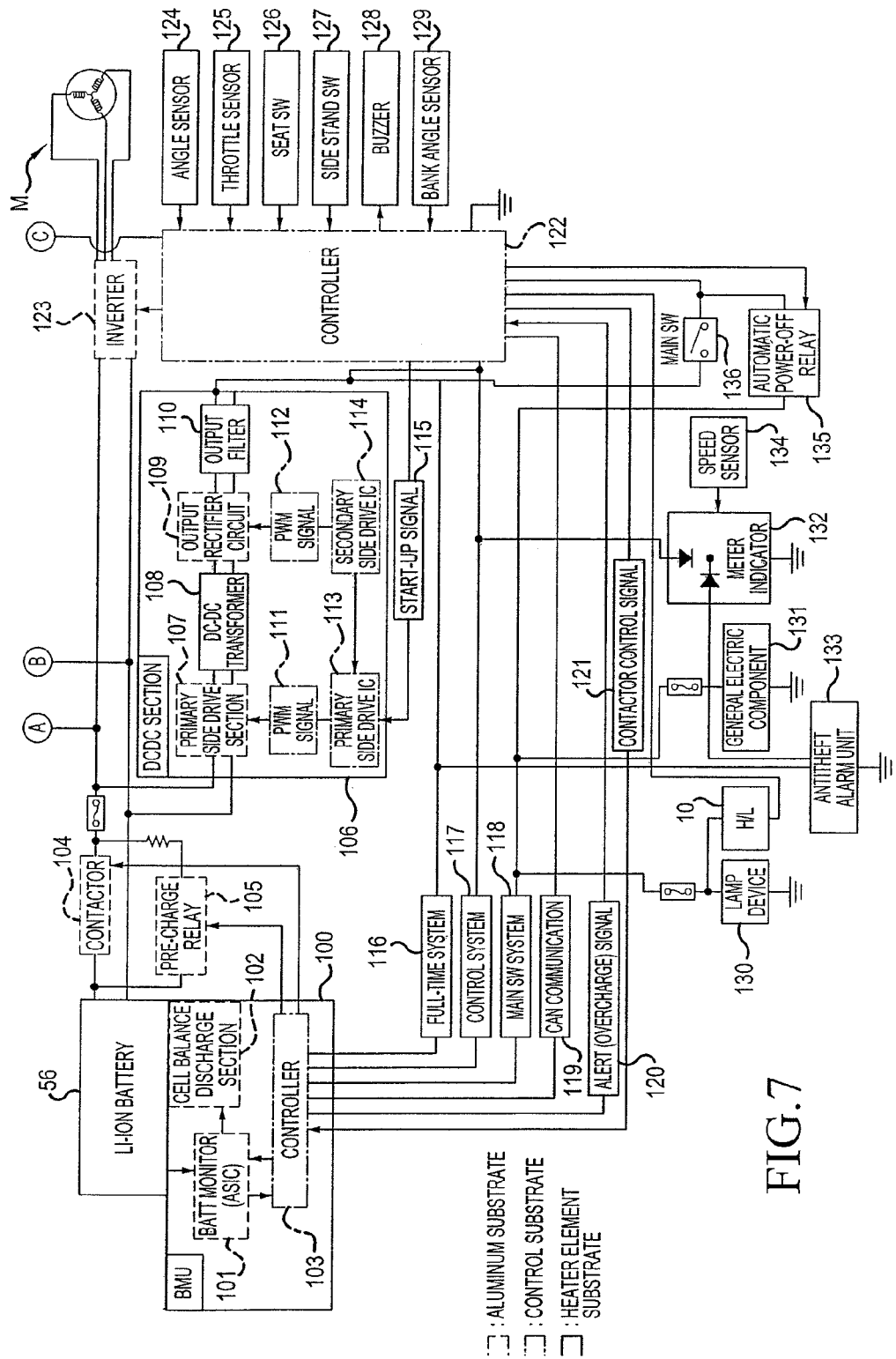
FIG. 7 is a block diagram of the entire configuration of an electric system applied to the motor-driven two-wheeled vehicle.
Figure 8:
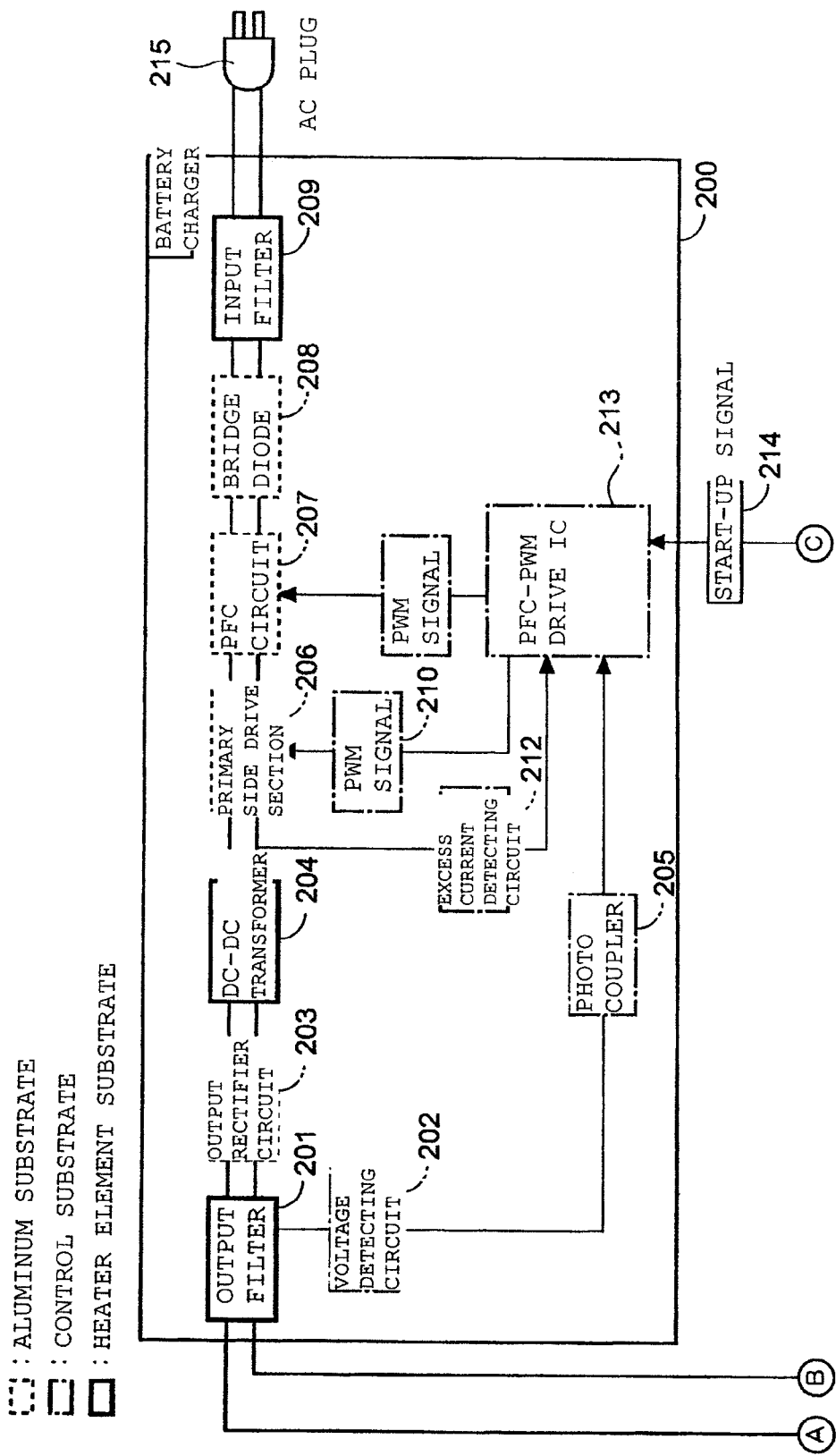
FIG. 8 is a block diagram illustrating a configuration of a battery charger portion of the electric system applied to the motor-driven two-wheeled vehicle.

FIGS. 7 and 8 are block diagrams illustrating a configuration of an electric system applied to the motor-driven two-wheeled vehicle 1. The same reference numerals as in the above denote like or corresponding portions. FIG. 8 illustrates a configuration circuit of only a battery charger and FIG. 7 illustrates the entire configuration of the others. In FIGS. 7 and 8, elements mounted on the control substrate 50*a* are denoted with "chain lines," elements mounted on the aluminum substrate 50*c* are denoted with "broken lines" and elements mounted on the heater element substrates 50*b* are denoted with "solid lines."

Elements in which small electric current for control signal flows are mounted on the control substrate 50*a*. These elements scarcely produce heat. The control substrate 50*a* is formed of a glass epoxy substrate. Elements in which a large electric current flows and which cannot self-radiate are mainly mounted on the aluminum substrate 50*c*. These electronic components are e.g. semiconductor elements (FET, diode), resistors, film capacitors, etc., and are mounted on the high thermally-conductive aluminum substrate 50*c* to enhance radiation performance. Large-sized electronic components in which large electric current flows and which can self-radiate are mainly mounted on the heater element substrate 50*b*. These electronic components are e.g. inductors, transformers, electrolyte capacitors, etc. The heat element substrate 50*b* is disposed at a position insusceptible to battery heat, thereby intending to improve heat buildup.

In the block diagrams of FIGS. 7 and 8, the following is mounted on the heater element substrate 50*c* an input filter 209 and an output filter 201 (corresponding to the input-output filter group mentioned above) of a battery charger 200, a PFC circuit 207 (corresponding to the capacitor for improving battery charger power factor mentioned above), an AC-DC transformer 204 (corresponding to the capacitor for battery charger DC conversion mentioned above), a DC-DC transformer 108 (corresponding to various transformer groups) of a DC-DC section 106, and an output filter 110.

With reference to FIG. 7, a lithium-ion battery 56 is electrically connected to an input side of an inverter 123 via a contactor 104. In addition, the electric motor M is connected to the output side of the inverter 123 via the three-phase AC lines. A pre-charge relay 105 adapted to prevent the sharp rise of supply current is connected in parallel to the contactor 104. The contactor 104 is on-off controlled by a mechanical contact activated by electromagnetic force.

A BMU (a battery management unit) 100 includes a circuit (ASIC) 101 for monitoring the voltage, temperature, etc. of the battery 56, a cell balance discharge section 102 for correcting for the variation in the capacity of the battery cells, and a controller 103 for controlling these.

Respective lines of a full-time system 116, a control system 117, a main switch system 118 and a CAN communication 119 are arranged between the controller 103 in the BMU 100 and the controller 122 as a control unit for controlling the inverter 123. The controller 103 of the BMU 100 sends out an overcharge alert signal 120 and the controller 122 of the inverter 123 sends out a contactor control signal 121.

The controller 122 for the inverter 123 receives respective sensor signals from an angle sensor 124 for detecting the rotation angle of the electric motor M, a throttle sensor 125 for detecting an amount of occupant's throttle operation, a seat SW (switch) 126 for detecting whether or not an occupant sits on the seat 20, a side stand SW 127 for detecting whether or not the side stand (not shown) of the motor-driven vehicle 1 is stored, and a bank angle sensor 129 for detecting a tilt angle (a bank angle) of the motor-driven vehicle. A buzzer 128 as an alarm device is actuated in response to an actuating signal from the controller 122 when the over discharge condition or the like of the battery 56 is detected.

The full-time system 116 is connected to a DCDC section 106 adapted to convert the large electric current supplied from the battery 56 into a control electric current. The DCDC section 106 includes a primary side drive section 107, a DC-DC transformer 108, an output rectifier circuit 109, an output filter 110, a primary side drive IC 113 for supplying a PWM signal to the primary side drive section 107 and a secondary side drive IC 114 for supplying a PWM signal to the output rectifier circuit 109. A start-up signal 115 is supplied from the controller 122 to the primary side drive IC 113. An antitheft alarm unit 133 and a main SW 136 are each connected on one end side to the full-time system 116.

The control system 117 is connected to the controller 122 for the inverter 123. The meter indicator 132 as an indicating lamp of the antitheft alarm unit 133 is connected to the control system 117 at one end. A speed sensor for detecting vehicle speed is connected to the meter indicator 133. The meter indicator 133 is configured to function as a speed warning lamp when the vehicle speed exceeds a predetermined value.

Lamp devices 130 such as a turn indicator and the like, a headlight (H/L) 10, and general electric components 131 such as a battery cooling fan and the like are connected to the main SW system 118. The main SW system 118 is connected at one end to an automatic power-off relay 135, which enables the operation of the headlight 10 and the like under given conditions even if the main SW 136 is turned off.

Referring to FIG. 8, DC input and output lines (A, B) connected to the battery 56 and an AC plug 215 connected to a commercial AC source and the like are connected to the battery charger 200. The battery charger 209 includes the input filter 209, a bridge diode 208, the PFC circuit 207 as a power factor improving circuit, a primary side drive section 206, the AC-DC transformer 204, an output rectifier circuit 203 and the output filter 201. A signal of an excess current detecting circuit 212 disposed between the primary side drive section 206 and the AC-DC transformer 204 is input to a PFC-PWM drive IC 213. On the other hand, a signal of the voltage detecting circuit 202 connected to the output filter 201 is input to the PFC-PWM drive IC 213 via a photo coupler 205. The PFC circuit 207 and the primary side drive section 206 are respectively driven by PWM signals 214 and 210 output from the PFC-PWM drive IC 213. The PFC-PWM drive IC 213 receives a start-up signal 214 (C) from the controller 122 for the inverter 123.

Figure 9:
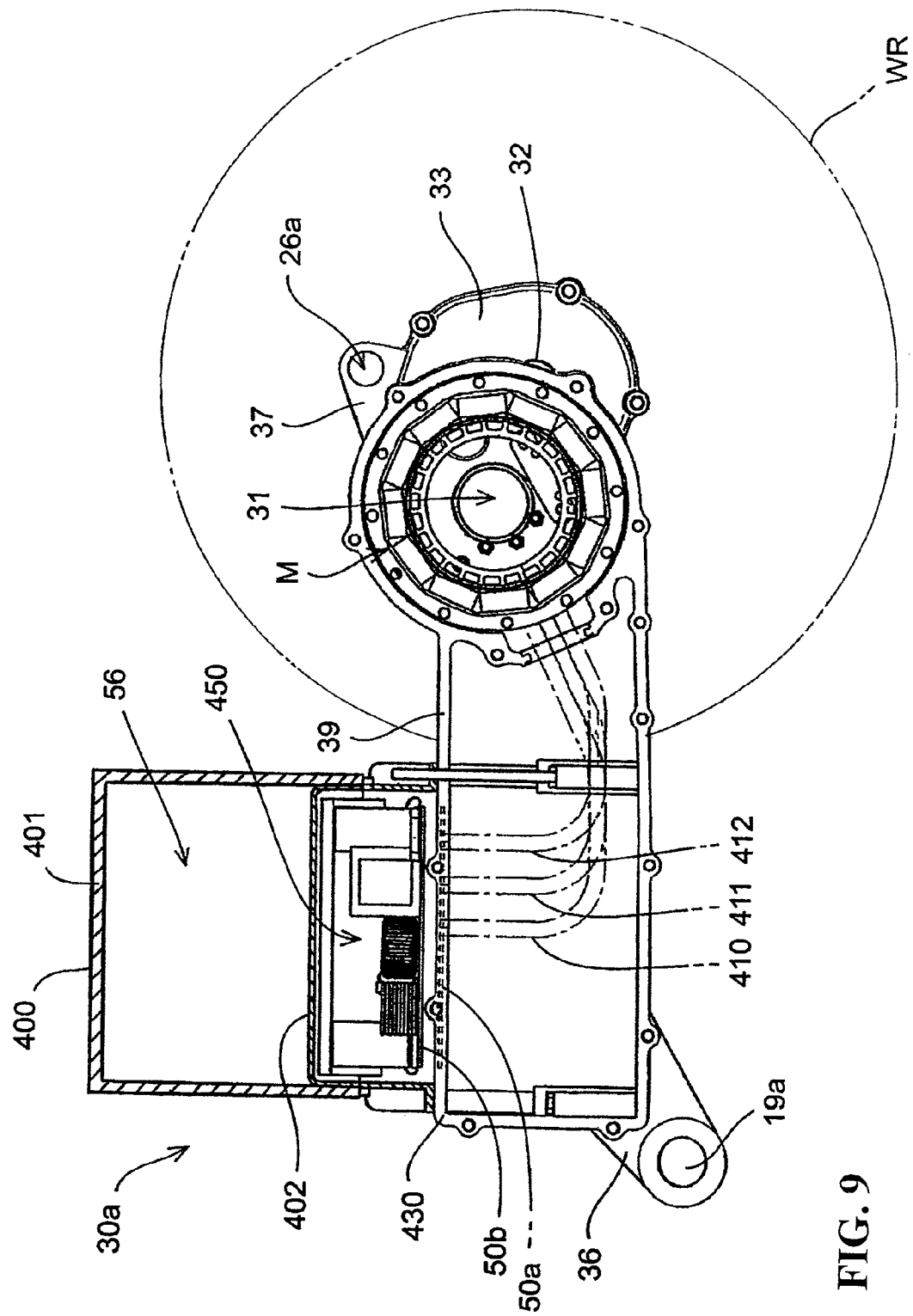
FIG. 9 is an enlarged lateral view of a swing arm according to a second embodiment of the present invention.
Figure 10:
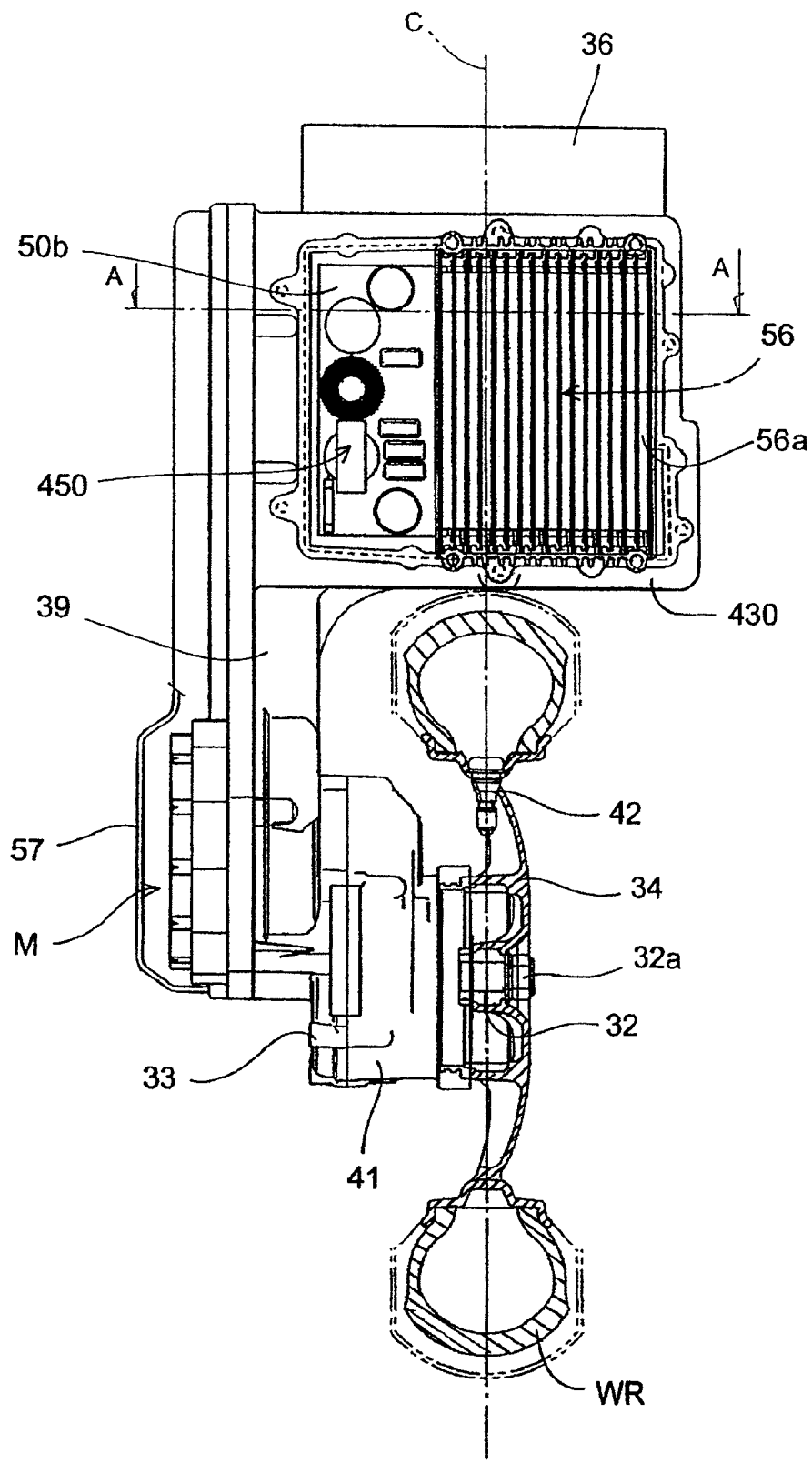
FIG. 10 is a partial-sectional top plan view of the swing arm.
Figure 11:
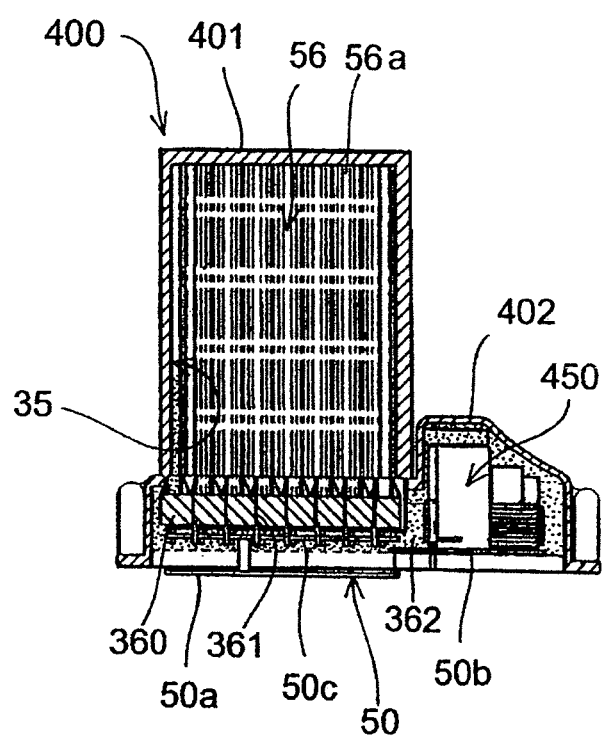
FIG. 11 is a cross-sectional view taken along line A-A in FIG. 9.

FIG. 9 is an enlarged lateral view of a swing arm 30a according to a second embodiment of the present invention. FIG. 10 is a partial-sectional top plan view of the swing arm 30a. FIG. 11 is a cross-sectional view taken along line A-A in FIG. 9. The same reference numerals as in the above denote like or corresponding portions. The second embodiment is characterized in that a housing case 400 housing a battery 56 and the like is mounted from the vehicle-body-upper side of the swing arm 30a with its opening portion facing the downside of the vehicle body. With this configuration, a generally rectangular parallelepipedic battery 56 is disposed on the swing arm 30a with the longitudinal direction thereof oriented in the vertical direction of the vehicle body. Therefore, the battery module mounting structure can be provided that can reduce the widthwise size to concentrate mass on the central side of the vehicle body and is suitable for vehicles having high vehicle-height.

Similarly to the first embodiment described above, the swing arm 30a has a partially hollow structure made of metal such as aluminum or the like. In addition, the swing arm 30a is of a cantilever type in which a vehicle-widthwise left arm portion 39 supports a rear wheel WR. A pair of left and right pivot flanges 36 each formed with a through-hole 19a is installed on the vehicle-body-front lower portion of the swing arm 30a.

As illustrated in FIG. 11, the housing case 400 is removably mounted on the vehicle-body-upper wall surface of a swing arm housing 430 formed integrally with the vehicle-body-front side of the arm portion 39. Thus, temporary assembling work for securing the battery 56 and the like to the housing case 400 can be done beforehand. Therefore, the assembly efficiency of the swing arm 30a can be improved.

In the present embodiment, a board (PDU) 50 is disposed on the vehicle-body-lower side of the battery 56. The board 50 includes an aluminum substrate 50c, a control substrate 50a, and a heater element substrate 50b. The aluminum substrate 50c is disposed adjacent to the lower surface of the battery 56. The control substrate 50a is spaced at a given interval apart from the aluminum substrate 50c and disposed at a position overlapping the aluminum substrate 50c as viewed from above the vehicle body. The heater element substrate 50b is disposed at a position between the control substrate 50a and the aluminum substrate 50c and on the vehicle-widthwise left side of both the substrates 50a and 50c.

Similarly to the embodiment described earlier, elements having low heat capacity such as signal elements, semiconductors (FET) and the like are mainly mounted on the control substrate 50a. Elements having a high calorific power, i.e., heater elements 450 are mounted on the heater element substrate 50b. Examples of the elements having high calorific power include a thermistor, an input-output filter group for battery charger, a capacitor for improving battery charger power factor (a PFC circuit), a capacitor for battery charger DC conversion (an AC-DC transformer), and various transformer groups (DC-DC transformers and the like). Semiconductor elements or the like having a lower calorific power than the heater elements mounted on the heater element substrate 50b are mounted on the aluminum substrate 50c. The heater element substrate 50b in which only the heater elements having high-calorific power are centrally arranged is installed as described above. Therefore, it is possible to reduce thermal loading of the heater elements exerted on the other elements.

A U-phase line 410, a V-phase line 411 and a W-phase line 412 are connected to the aluminum substrate 50c to supply electric power to the transmission motor M. A thin plate-like swing arm cover 57 (removed in FIG. 8) is attached to the vehicle-widthwise left side of the swing arm housing 430 so as to integrally cover the board (PDU) 50 and the electric motor M.

A reducer case 33 and 41 in which a reducer is housed is attached to the rear end portion of the arm portion 39. The reducer reduces the rotation of the electric motor M. An axle 32 projects from the reducer case 41 toward the vehicle-widthwise right side. A wheel 34 of the rear wheel WR is secured to the end portion of the axle 32 by means of a nut 32a. The rear wheel WR uses a tubeless tire and the wheel 34 is provided with an air valve 42. The reducer case 33 is provided with an attachment flange 37 having a through-hole 26a used to attach the rear cushion 26 (see FIG. 1) thereto.

The housing case 400 is configured such that a battery housing portion 401 and a heater element housing portion 402 are formed integrally with each other. A housing space 35 is composed of a quadrangular battery housing space 401a formed in the battery housing portion 401 and a recessed heater element housing space 302a formed in the heater element housing portion 402. A generally rectangular parallelepipedic battery 56 composed of a plurality of battery cells 56a and having the longitudinal direction oriented in the vertical direction of the vehicle body is housed in the battery housing portion 401. The heater elements 450 mounted on the vehicle-body-upper surface of the heater element substrate 50b are housed in the heater element housing portion 402 in such a manner that the upper end side of the heater element 450 is inserted thereinto. The battery 56, the heater element substrate 50b and the aluminum substrate 50c are subjected to potting with a potting compound 362.

As described above, the battery module mounting structure for a motor-driven two-wheeled vehicle according to the present invention is such that the battery and the substrates are housed in the housing case so as to be mountable to and dismountable from the swing arm. Therefore, the battery and the substrates can be handled as a module mounted to and dismounted from the swing arm. This makes it possible to previously perform the temporary assembling work for securing the battery and the like to the housing case. Thus, the swing arm assembly efficiency can be improved. In addition, the work for replacing the battery after the completion of the vehicle can be facilitated and general versatility in which a communalized housing case is applied to a variety of swing arms can be enhanced.

In addition, the shapes, structure, etc., of the motor-driven two-wheeled vehicle, the swing arm, the housing case, the substrates, the battery and the sponge rubber are not limited to the embodiments described above and can be modified in various ways. The battery module mounting structure according to the present invention can be applied to various motor-driven vehicles such as straddle-ride type three/four-wheeled vehicles as well as to the motor-driven two-wheeled vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery module mounting structure for a motor-driven two-wheeled vehicle, having an electric motor driving a rear wheel of the vehicle and a PDU disposed in a swing arm rotatably supporting the rear wheel and swingably supported by a vehicle body via a swing shaft passing through a through-hole formed in a front side of the vehicle body, the battery module mounting structure comprising:
   a housing case housing a battery supplying electric power to the electric motor and the PDU for controlling the electric motor;
   wherein the housing case is configured to be mountable to and dismountable from the swing arm with the battery and the PDU housed in the housing case,
   wherein the PDU includes an aluminum substrate disposed adjacent to one lateral surface of the battery, a control substrate spaced at a given interval apart from the aluminum substrate, and a heater element substrate disposed at a position between the control substrate and the aluminum substrate and offset from one lateral surface of the battery; and
   a heater element, with a higher-calorific power than each of the control substrate and the aluminum substrate, is mounted on the heater element substrate.

2. The battery module mounting structure for a motor-driven two-wheeled vehicle according to claim 1, wherein:
   the swing arm is of a cantilever type and includes:
   a pivot flange swingably supported on the swing shaft;
   a swing arm housing directly rearward of the pivot flange;
   an arm portion supported by the swing arm housing;
   wherein the arm portion is disposed directly rearward of the swing arm housing on the vehicle-widthwise right or left of the rear wheel and supports the rear wheel;
   the housing case is mounted from a vehicle-widthwise inside on a lateral surface of the swing arm housing at a position vehicle-body-forward of the rear wheel and vehicle-body-rearward of the through-hole, and
   the battery is shaped in a rectangular parallelepiped form and is housed in the housing case with a longitudinal direction thereof facing in a vehicle-width direction.

3. The battery module mounting structure for a motor-driven two-wheeled vehicle according to claim 1, wherein:
   the swing arm is of a cantilever type and includes:
   a pivot flange swingably supported on the swing shaft;
   a swing arm housing directly rearward of the pivot flange;
   an arm portion supported by the swing arm housing;
   wherein the arm portion is disposed directly rearward of the swing arm housing on the vehicle-widthwise right or left of the rear wheel and supports the rear wheel;
   the housing case is mounted above the vehicle body on an upper surface of the swing arm housing at a position vehicle-body-forward of the rear wheel and vehicle-body-rearward of the through-hole, and
   the battery shaped in a rectangular parallelepiped form and is housed in the housing case with a longitudinal direction thereof facing in a vertical direction of the vehicle.

4. The battery module mounting structure for a motor-driven two-wheeled vehicle according to claim 3, wherein the heater element substrate constituting part of the PDU is aligned with the battery in a vehicle-width direction so as not to overlap the battery as viewed from above the vehicle body.

5. The battery module mounting structure for a motor-driven two-wheeled vehicle according to claim 1, wherein the battery is configured such that a plurality of laminate type battery cells are stacked with each being packed with a soft laminate sheet on a cell to cell basis.

6. The battery module mounting structure for a motor-driven two-wheeled vehicle according to claim 1, wherein the battery is housed in the housing case and thereafter a potting compound is poured into an opening portion of the housing case to secure the battery to the housing case.

7. The battery module mounting structure for a motor-driven two-wheeled vehicle according to claim 6, wherein:
   the potting compound also covers an aluminum substrate constituting part of the PDU, and is disposed adjacent to one lateral surface of the battery; and
   sponge rubber lighter than the potting compound is disposed between one end surface of the battery and the aluminum substrate.

8. The battery module mounting structure for a motor-driven two-wheeled vehicle according to claim 1, wherein the housing case includes:
   a battery housing portion housing the battery, and
   a heater element housing portion housing the heater element.

9. A battery module mounting structure adapted for use with a motor-driven two-wheeled vehicle, having an electric motor driving a rear wheel of the vehicle and a PDU disposed in a swing arm rotatably supporting the rear wheel and swingably supported by a vehicle body via a swing shaft passing through a through-hole formed in a front side of the vehicle body, the battery module mounting structure comprising:
   a housing case;
   a battery for supplying electric power to the electric motor and the PDU for controlling the electric motor, said battery and PDU being positioned within said housing case;
   said housing case is mountable to and dismountable from the swing arm with the battery and the PDU housed in the housing case,
   wherein the battery is housed in the housing case, and thereafter a potting compound is poured into an opening portion of the housing case to secure the battery to the housing case, and
   the potting compound also covers an aluminum substrate constituting part of the PDU, and is disposed adjacent to one lateral surface of the battery; and
   sponge rubber that is lighter than the potting compound is disposed between one end surface of the battery and the aluminum substrate.

10. The battery module mounting structure adapted for use with a motor-driven two-wheeled vehicle according to claim 9, wherein:
    the swing arm is of a cantilever type and includes:
    a pivot flange swingably supported on the swing shaft;
    a swing arm housing directly rearward of the pivot flange;
    an arm portion supported by the swing arm housing;
    wherein the arm portion is disposed directly rearward of the swing arm housing on the vehicle-widthwise right or left of the rear wheel and supports the rear wheel;
    the housing case is mounted from a vehicle-widthwise inside on a lateral surface of the swing arm housing at a position vehicle-body-forward of the rear wheel and vehicle-body-rearward of the through-hole, and
    the battery is shaped in a rectangular parallelepiped form and is housed in the housing case with a longitudinal direction thereof facing in a vehicle-width direction.

11. The battery module mounting structure adapted for use with a motor-driven two-wheeled vehicle according to claim 9, wherein:
    the swing arm is of a cantilever type and includes:

a pivot flange swingably supported on the swing shaft;
a swing arm housing directly rearward of the pivot flange;
an arm portion supported by the swing arm housing;
wherein the arm portion is disposed directly rearward of the swing arm housing on the vehicle-widthwise right or left of the rear wheel and supports the rear wheel;
the housing case is mounted above the vehicle body on an upper surface of the swing arm housing at a position vehicle-body-forward of the rear wheel and vehicle-body-rearward of the through-hole, and
the battery shaped in a rectangular parallelepiped form and is housed in the housing case with a longitudinal direction thereof facing in a vertical direction of the vehicle body.

12. The battery module mounting structure adapted for use with a motor-driven two-wheeled vehicle according to claim 11, wherein a heater element substrate constituting part of the PDU is aligned with the battery in a vehicle-width direction so as not to overlap the battery as viewed from above the vehicle body, and
a heater element having a high-calorific power is mounted on the heater element substrate.

13. The battery module mounting structure adapted for use with a motor-driven two-wheeled vehicle according to claim 9, wherein the battery is configured such that a plurality of laminate type battery cells are stacked with each being packed with a soft laminate sheet on a cell to cell basis.

14. The battery module mounting structure adapted for use with a motor-driven two-wheeled vehicle according to claim 9, wherein:
the PDU includes an aluminum substrate disposed adjacent to one lateral surface of the battery, a control substrate spaced at a given interval apart from the aluminum substrate, and a heater element substrate disposed at a position between the control substrate and the aluminum substrate and offset from one lateral surface of the battery; and
a heater element, with higher-calorific power than each of the control substrate and the aluminum substrate, is mounted on the heater element substrate.

15. The battery module mounting structure adapted for use with a motor-driven two-wheeled vehicle according to claim 14, wherein the housing case is includes:
a battery housing portion housing the battery, and
a heater element housing portion housing the heater element.

16. A battery module mounting structure adapted for use with a motor-driven two-wheeled vehicle, having an electric motor driving a rear wheel of the vehicle and a PDU disposed in a swing arm rotatably supporting the rear wheel and swingably supported by a vehicle body via a swing shaft passing through a through-hole formed in a front side of the vehicle body, the battery module mounting structure comprising:
a housing case;
a battery for supplying electric power to the electric motor and the PDU for controlling the electric motor, said battery and PDU being positioned within said housing case;
said housing case is mountable to and dismountable from the swing arm with the battery and the PDU housed in the housing case, wherein:
the swing arm is of a cantilever type and includes:
a pivot flange swingably supported on the swing shaft;
a swing arm housing directly rearward of the pivot flange;
an arm portion supported by the swing arm housing;
wherein the arm portion is disposed directly rearward of the swing arm housing on the vehicle-widthwise right or left of the rear wheel and supports the rear wheel;
the housing case is mounted from a vehicle-widthwise inside on a lateral surface of the swing arm housing at a position vehicle-body-forward of the rear wheel and vehicle-body-rearward of the through-hole, and
the battery is shaped in a rectangular parallelepiped form and is housed in the housing case with a longitudinal direction thereof facing in a vehicle-width direction,
wherein a heater element substrate constituting part of the PDU is aligned with the battery in a back and forth direction of the vehicle body so as not to overlap the battery as viewed from the side of the vehicle body, and
a heater element having a high-calorific power is mounted on the heater element substrate.

17. The battery module mounting structure for a motor-driven two-wheeled vehicle according to claim 16, wherein:
the PDU includes an aluminum substrate disposed adjacent to one lateral surface of the battery, a control substrate spaced at a given interval apart from the aluminum substrate, and the heater element substrate disposed at a position between the control substrate and the aluminum substrate and offset from one lateral surface of the battery; and
the heater element, with a higher-calorific power than each of the control substrate and the aluminum substrate, is mounted on the heater element substrate.

18. The battery module mounting structure adapted for use with a motor-driven two-wheeled vehicle according to claim 16, wherein the battery is housed in the housing case and thereafter a potting compound is poured into an opening portion of the housing case to secure the battery to the housing case.

19. The battery module mounting structure adapted for use with a motor-driven two-wheeled vehicle according to claim 18, wherein:
the potting compound also covers an aluminum substrate constituting part of the PDU, and is disposed adjacent to one lateral surface of the battery; and
sponge rubber that is lighter than the potting compound is disposed between one end surface of the battery and the aluminum substrate.

* * * * *